Feb. 10, 1925.   1,525,536
C. DEBROT
PROCESS OF MANUFACTURING SCREW TAPS OR SIMILAR THREAD CUTTING TOOLS
Filed Oct. 21, 1922

Inventor
Charles Debrot

Patented Feb. 10, 1925.

1,525,536

UNITED STATES PATENT OFFICE.

CHARLES DEBROT, OF DELLE, FRANCE, ASSIGNOR TO SOCIETE INDUSTRIELLE DE DELLE, OF DELLE, TERRITOIRE DE BELFORT, FRANCE, A LIMITED JOINT STOCK COMPANY OF FRANCE.

PROCESS OF MANUFACTURING SCREW TAPS OR SIMILAR THREAD-CUTTING TOOLS.

Application filed October 21, 1922. Serial No. 595,908.

*To all whom it may concern:*

Be it known that I, CHARLES DEBROT, citizen of the Republic of France, residing at Delle, Territoire de Belfort, France, have invented certain new and useful Improvements in Processes of Manufacturing Screw Taps or Similar Thread-Cutting Tools, of which the following is a specification.

My invention has reference to screw-taps and the like, and my present invention consists in a new process of manufacturing screw-taps, and similar thread-cutting tools.

In the accompanying drawing.

Figure 1:
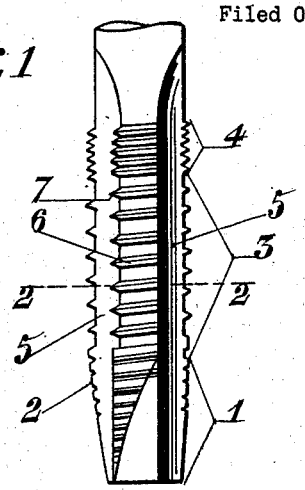
Fig. 1 is an elevation of a screw tap in accordance with this invention.
Figure 2:
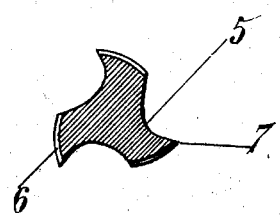
Fig. 2 is a section of said screw tap on line 2—2 of Fig. 1.

The screw-tap as shown in Figs. 1 and 2 comprises a first working portion 1 having a slightly conical outline and provided with a few teeth 2 having shallow faces; a second working portion 3 is provided with an interrupted set of teeth, that is, a series of teeth as in the ordinary screw taps, except that one tooth out of every two is omitted; a third working portion 4 shows a series of teeth of normal outline.

Three longitudinal grooves 5 produce, in a well-known manner, three toothed zones 6 with a cutting edge 7.

The invention now consists in a new process of producing in a particular precise manner the interrupted series of teeth, that is the portion 3 of the tap.

This new process which makes it possible to obtain in a simple manner and with great accuracy, screw taps with alternate or discontinuous teeth, consists essentially first in threading the shank of the screw tap in the usual way to the pitch of the discontinuous teeth it is desired to obtain, and then by a reverse helical cut half the original thread is removed so as to leave a helical strip or portion and when the usual longitudinal grooves are cut in the shank to finish the screw tap the remaining intact portions of the original thread in one toothed zone will alternate with the intact portions in the next zone.

The operation may be carried out as follows:—

Figure 3:
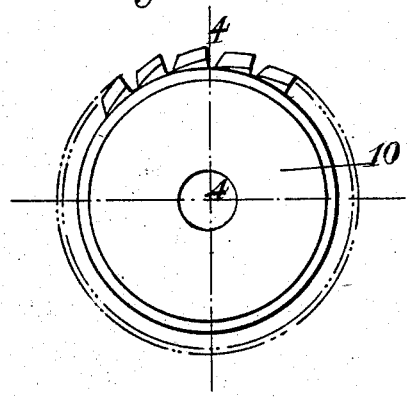
Fig. 3 is an elevation of a cutter used in a special process of manufacture which also forms part of this invention.
Figure 4:
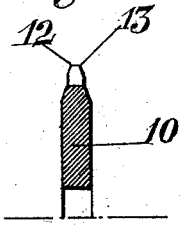
Fig. 4 is a section of said cutter on line 4—4 of Fig. 3.

On a cutting machine is fitted a cutter 10 (Figs. 3 and 4) the truncation of which, i. e. the distance the edges 12 and 13, is equal to the pitch of the screw-tap to be formed. Said cutter is displaced in a direction opposite to the pitch of the threads and proportionally to the number of edges of the screw-tap so as to cross the pitch as many times as there are divisions in the screw tap.

Figure 5:
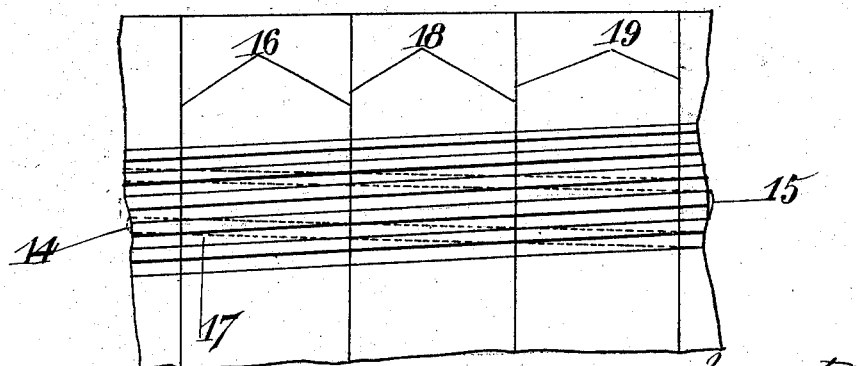
Fig. 5 is a diagrammatic partial development of the surface of a screw tap made by said process.

In the course of said motion, the cutter cuts on the screw-tap a groove 14 as shown in the diagrammatic view, Fig. 5, which is such that each thread 15 is almost entirely removed by the cutting of the groove 14 in the division 16 of the screw-tap, excepting a few cut portions such as 17. The same thread is slightly torn off in the division 18 and is not touched in the division 19.

It is therefore sufficient, after cutting the groove 14 to remove the cut portions such as 17 and to make the longitudinal cuts in one division out of two, as for instance, in division 18, and a screw-tap partly toothed only is thus obtained.

Claims:

1. The method of producing screw taps or similar thread cutting tools having interrupted teeth, which consists in first threading in the usual way the shank of the screw tap to the pitch of the interrupted thread it is desired to obtain, then cutting this screw tap along a groove in the reverse direction of the threads of the screw tap, the said groove being inclined at an angle, so as to remove one tooth out of two in the toothed zones provided between the usual longitudinal cuts of the tap, and finally finishing the tap by producing therein said longitudinal cuts.

2. The method as specified in claim 1, in which the said inclined groove is cut by means of a cutter having a truncation equal to the size of the screw-threads of the tap, the said cutter being at the same time given a rotary movement about its axis and a travelling movement parallel to the axis of the tap in the reverse direction relative to the pitch of the tap.

In testimony whereof I affix my signature.

CHARLES DEBROT.